April 11, 1961     C. H. McALPINE     2,978,762
BURN CASTER
Filed June 17, 1957     3 Sheets-Sheet 1
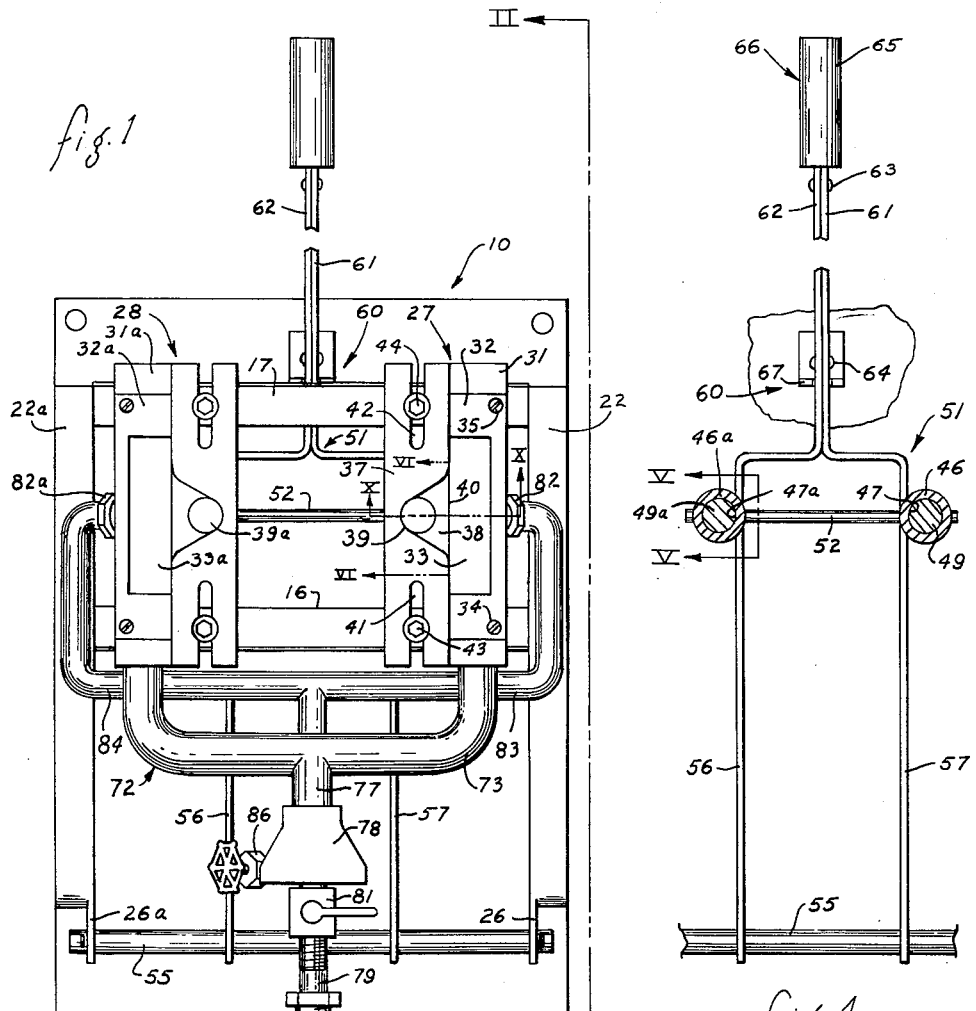
fig. 1
fig. 4
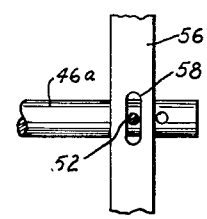
fig. 5
INVENTOR.
CHARLES H. McALPINE
BY
ATTORNEYS

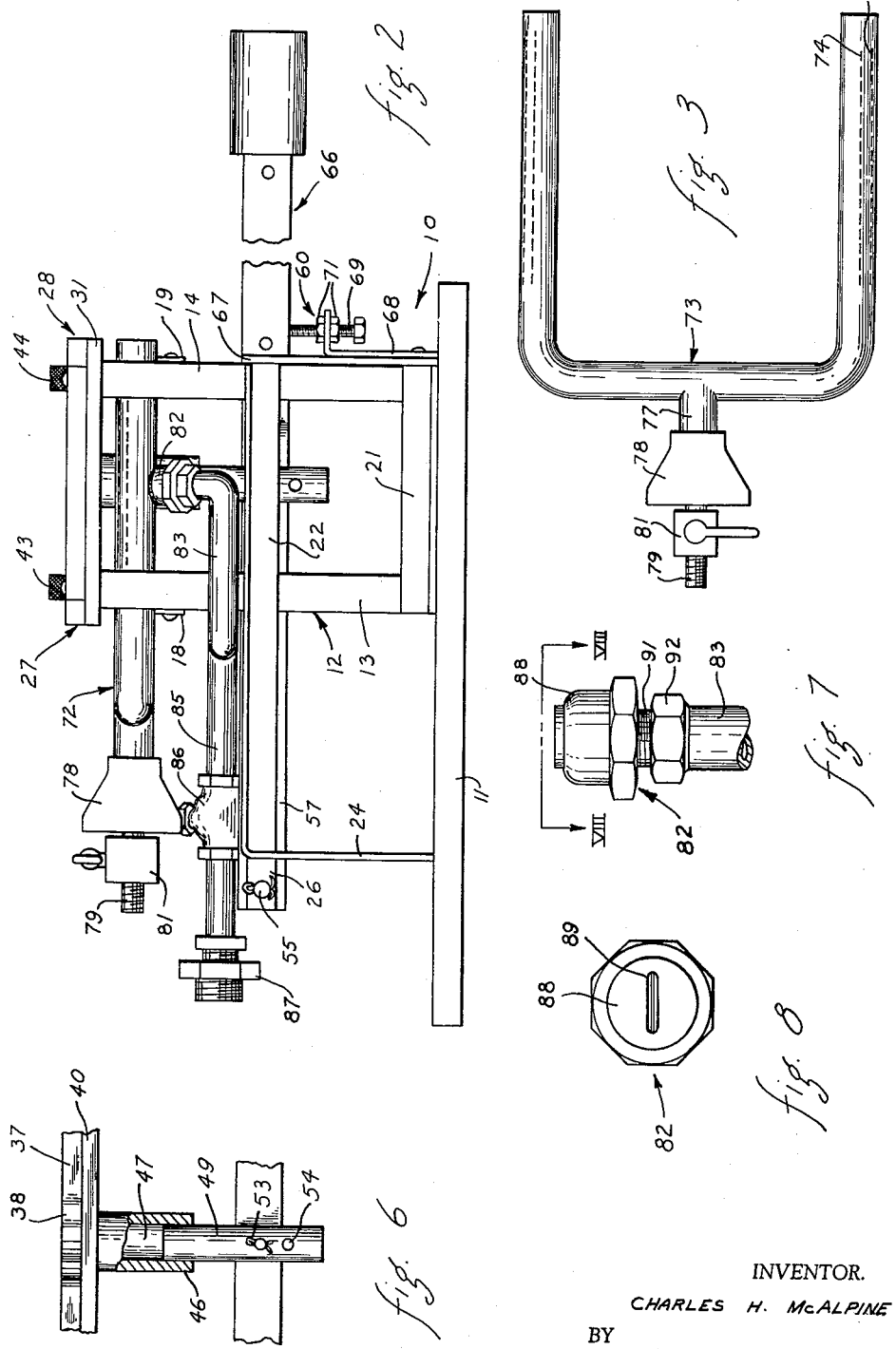

April 11, 1961 C. H. McALPINE 2,978,762
BURN CASTER

Filed June 17, 1957 3 Sheets-Sheet 3

INVENTOR.
CHARLES H. McALPINE
BY
Woodhams Blanchard and Flynn
ATTORNEYS

United States Patent Office 2,978,762
Patented Apr. 11, 1961

2,978,762
BURN CASTER

Charles H. McAlpine, Box 317, R.R. 1, Coloma, Mich.

Filed June 17, 1957, Ser. No. 666,010

2 Claims. (Cl. 22—58)

This invention relates to a battery making machine and, more particularly, it relates to the formation of battery terminal post and connecting bar structure and to the connection thereof to selected battery plates.

In conventional methods for assembling battery cell groups, it is the usual practice to prepare a suitable group of battery plates and associate them with separators in substantially the position with respect to each other which they are to occupy in the finished battery. As a separate operation, a battery terminal post is formed, usually by casting, and it is formed integral with a connecting bar. Finally, as a third operation, separate from the above operations, there is carried out what is known in the trade as a "burning" operation, in which the connecting bar associated with the terminal post is connected to, and between, the several lugs of the battery plates by heating the bar and causing it to soften or melt while in contact with the lugs, and thereafter rigidifying the bar to affix said bar and, consequently, the terminal post, to the lugs.

This provides a satisfactory battery cell group, but with the casting operation and the burning operation carried out as two separate operations and in two separate, and different, types of machines, it appears that this is a point at which effort will be spent in order to reduce the cost of storage battery manufacture.

It has been suggested that the battery terminal post could be cast in the same operation with the connection thereof to the lugs of the battery plates. However, previous procedures for carrying out this approach have encountered difficulties in controlling the temperature of the melted lead so that it could properly unite with the several, spaced lugs of the battery plates. Particularly, it was found that when the lead was at a proper temperature in the middle of the battery cell group, it was often too cold to unite properly with the lugs at the end of the cell group and, if it was heated sufficiently to unite properly with the lugs at the end of the cell group, its temperature in the central region thereof was sufficient to cause the lugs in the center of the battery cell group to melt out.

Accordingly, the objects of the invention are the following:

(1) To provide a process for forming a battery terminal post simultaneously with the fastening of the post to the several lugs of a battery cell group in a single operation;

(2) To provide a process, as aforesaid, in which the temperature of the lead contacting each of the battery plate lugs will be at substantially the same level;

(3) To provide a process, as aforesaid, which can be carried out by relatively simple mechanism and mechanism which can be hand-operated, where desired, for small production runs;

(4) To provide a process, as aforesaid, which is readily adaptable to embodiment in automatic apparatus for handling large production runs;

(5) To provide a process, as aforesaid, in which the temperature of the lead can be kept within closely controlled limits; and (6) To provide apparatus for carrying out the process, as aforesaid.

Other objects and purposes of the invention will be apparent to persons acquainted with procedures of the general type here involved upon a reading of the following specification and an inspection of the accompanying drawings.

In the drawings:

Figure 1 is a top view of a hand-operated apparatus for carrying out the process of the invention.

Figure 2 is a side view of the apparatus, taken along the line II—II of Figure 1.

Figure 3 is a top view of the mechanism for heating the mold structures.

Figure 4 is a top view, partially in section, of the ejection mechanism.

Figure 5 is a sectional view taken along the line V—V of Figure 4.

Figure 6 is a partially broken view along the line VI—VI of Figure 1.

Figure 7 is a side view of the water-supplying nozzle.

Figure 8 is a top view taken along the line VIII—VIII of Figure 7.

General description

Figure 9:
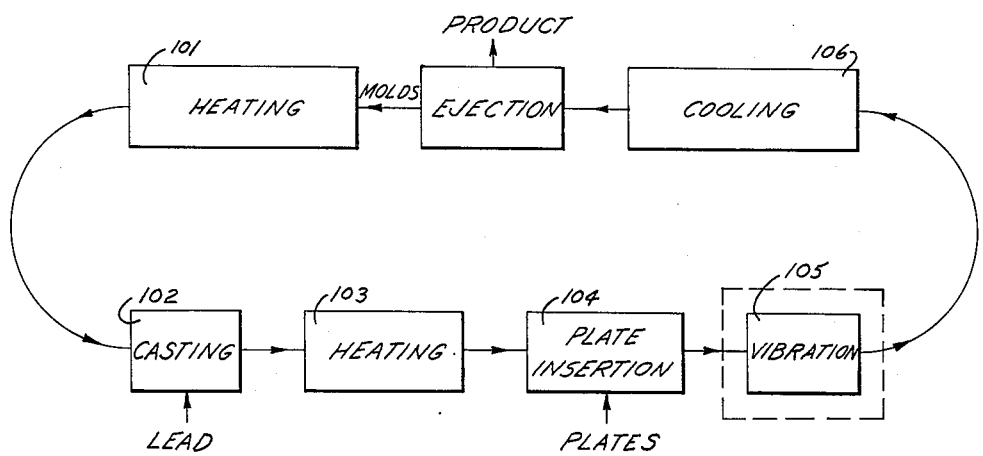
Figure 9 is a schematic, flow diagram of a continuous process, in accordance with the invention.

In general, the process of the invention comprises: maintaining a quantity of lead in a molten condition in a mold, which mold is used for forming a battery terminal post, together with a connecting bar; equalizing the temperature of the entirety of such quantity of lead; inserting the lug portions of a plurality of battery plates into the melted lead in the connecting bar portion of the mold; and thereupon rapidly cooling the lead to solidify it onto, and in connection with, said lugs. In some instances, it will be advantageous to subject the molten lead and/or the lugs to a certain amount of vibration after the insertion of said lugs into the lead and before any material cooling of the lead takes place.

Detailed description

While the principal novelty of the present invention is believed to reside in the process above outlined, such process will be better understood if described in connection with suitable apparatus by which the process may be practiced. Accordingly, an apparatus for practicing the process substantially by hand will be described, and then the process will be further described in connection with such apparatus. However, such description of a particular apparatus should be clearly understood to be adopted solely for convenience in describing the process, and that the process is by no means limited to such an apparatus.

Referring to Figures 1 and 2 of the drawings, the apparatus includes a frame 10, which includes a base plate 11 and an upwardly extending mold support structure 12. The mold support structure 12 includes two pairs of vertically extending posts, one post of each of the respective pairs appearing at 13 and 14 in Figure 2. The upper ends of the respective pairs of posts are connected by horizontally extending support members 16 and 17. Cross-straps 18 and 19 are secured to, and extend between the respective posts of each pair, intermediate the upper and lower edges thereof. A bottom support bar 21 is secured to the lower ends of the vertically extending posts 13 and 14 and to the upper surface of the base plate 11. A corresponding bar is secured to the lower ends of the other vertically extending posts in a similar fashion. A pair of horizontally extending support members 22 and 22a are secured to one post of each pair of the vertically extending posts, member 22 here being secured to the posts 13 and 14, intermediate the upper and lower ends thereof. The horizontal support members 22, and 22a, the vertically extending posts, including posts 13 and 14, the horizontally extending support members 16 and 17 and the bottom support bars including bar 21 may, for convenience, be formed of suitable conventional angle iron members. The horizontal flanges of the support members 22 and 22a are bent downwardly to form legs, of which one appears at 24, which legs are secured to the upper surface of the base plate 11. The vertical flanges of the members 22 and 22a are extended at 26 and 26a, rearwardly of the legs 24, for purposes appearing hereinafter.

A pair of mold structures 27 and 28 are provided, one of said mold structures being mounted above the posts 13 and 14 and the other of said mold structures being mounted above the corresponding posts on the other side of the mold support structure 12. Since the mold structures 27 and 28 are identical, only mold structure 27 will be described in detail herein. Corresponding reference numerals with the suffix "a" applied thereto will be used with respect to corresponding parts in the mold structure 28.

Figure 10:
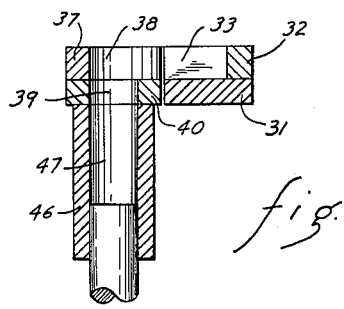
Figure 10 is a sectional view taken along the line X—X of Figure 1.

The mold structure 27 (Figure 1) includes a base plate 31 which may, desirably, be formed of a highly heat-conductive material, such as aluminum or brass. A mold plate 32, having a recess 33 formed in the inner longitudinal edge thereof, is disposed on top of the base plate 31. The recess 33, as will be described in greater detail hereinbelow, defines the mold cavity for forming the connecting bar. The base plate 31 and the mold plate 32 are secured to the horizontally extending support members 16 and 17 by securing means, such as the screws 34 and 35. A terminal post molding plate 37 is disposed adjacent the inner edges of the base plate 31 and the mold plate 32. The terminal post molding plate 37 includes a passage 38 in its upper edge, which passage communicates with the recess 33 in the mold plate 32. A base plate 40 underlies the molding plate 37. As is shown in Figure 10, the plates 31 and 40 are separate pieces, but are located in contact with each other. By providing a plane of discontinuity between them, there is obtained a lessening of heat conduction therebetween during the heating operation, as hereinafter described in detail. However, by having them in actual contact with each other, there is no tendency for the lead to run down between them. The passage 38 communicates with an opening 39 through the terminal post molding plate 37 and through the base plate 40. A pair of slots 41 and 42 are provided in the ends of the terminal post molding plate 37. Bolts 43 and 44 extend through said slots 41 and 42, respectively, and secure said terminal post molding plate 37 in adjustable, longitudinally slidable position on the support members 16 and 17.

A terminal post molding cylinder 46 (Figure 6) extends downwardly from the plate 37 and its central opening 47 communicates with the opening 39. The central opening 47 and the opening 39 define the mold cavity for the terminal post.

A pair of pins 49 and 49a (Figure 4) are slidably receivable within the openings 47 and 47a. The pnis are secured to an ejecting frame 51. The ejecting frame includes a connecting bar 52 which extends through openings in the pins 49 and 49a and is secured in such position by means, such as a cotter pin 53 (Figure 6). One or more additional openings 54 may be provided in the pins 49 and 49a in order that said pins may be held in a variety of positions within the central openings 47 and 47a. The actuating frame 51 also includes a shaft 55 which extends between, and is rotatably secured in, the extensions 26 and 26a of the horizontal support members 22 and 22a, respectively. A pair of arms 56 and 57 are secured to the shaft 55 and extend to and beyond pins 49 and 49a. The arms 56 and 57 each have and elongated, horizontal slot formed therein, of which one is shown at 58 in Figure 5. The connecting bar 52 extends through the slots, for purposes appearing hereinafter. The ends of the arms 56 and 57 (Figure 4) remote from the shaft 55 extend toward each other. The adjacent sections 61 and 62 of the arms 56 and 57 are secured together by bolts 63 and 64. A hand grip 65 is secured over the ends of the sections 61 and 62. The sections 61 and 62 and the hand grip 65 provide an actuating handle 66 for the frame 51.

A handle support structure 60 for the frame 51 is secured to the leftward, as appearing in Figure 2, pair of vertical posts of the mold support structure 12. The handle support includes a plate 67 and an angle member 68. A bolt 69 extends through the horizontal flange of the angle member 68 and is secured in adjustable, vertical position by the nuts 71. The handle 66 is adapted to rest upon the upper end of the bolt 69 at all times except during the ejecting portion of the process.

A burner structure 72 is provided for heating the mold structures 27 and 28 and rests upon the cross-bars 18 and 19. The burner structure includes a substantially U-shaped tube 73. Each leg of the U-shaped tube 73 (Figure 3) has two rows 74 and 75 aligned apertures, which apertures are positioned so that flames emanating therefrom may be directed primarily against the base plates 31 and 31a of the mold structures throughout substantially the entire length thereof. The U-shaped tube 73 has a leg portion 77 extending therefrom, said leg portion being received within a fitting 78. The fitting 78 is of a conventional type wherein the entering gas is mixed with a suitable proportion of air to form a combustible, air-gas mixture. Gas is fed to the fitting 78 through a conduit 79 having a valve 81 therein.

The cooling means structure for the mold structures 27 and 28 includes a pair of nozzles 82 and 82a, which nozzles are connected by conduits 83 and 84 to a common supply line 85 (Figure 2). A manually operable valve 86, of any conventional construction, is provided in the supply line 85. A fitting 87, of any suitable construction, is provided at the end of the supply line 85, whereby the supply line may be connected to a suitable source of cooling fluid, as water under pressure. The nozzles 82 and 82a, as shown in Figures 7 and 8, each includes a dome-shaped member 88 having an elongated slot 89 therein. The dome-shaped member 88 has a threaded shank 91 which is receivable within a fitting 92 on the conduit 83. It will be noted that the nozzles 82 and 82a are inclined upwardly and inwardly, so that the flow of coolant therefrom will be directed not only against the surface of the base plates 31 and 31a of the mold structures, but will also be directed against the terminal post molding cylinder members 46 and 46a so that accelerated cooling of the material therewithin may be effected.

Operation

In preparing the apparatus for use, the valve 81 is opened to admit the combustible air-gas mixture to the U-shaped tube 73. The combustible air-gas mixture emanating from the two rows of openings 74 and 75 (Figure 3) is then ignited in any suitable fashion, and the flame produced thereby is directed primarily against the base plates 31 and 31a of the mold structures 27 and 28. A suitable quantity of material for filling the terminal post mold cavity and the connecting bar mold cavity will then be deposited in the mold structures 27 and 28. The material, which is conventionally lead, may be, and usually is, introduced into the mold structures in a molten condition, but, under some circumstances, it can be in a relatively rigid state when it is placed in the mold structures. The heating of the lead in the mold structures is continued until the material is at a substantially uniform temperature, particularly the material within the recesses 33 and 33a. Also, since it will often be difficult to control the temperature of the lead as it is poured into the mold structures, the heating operation will tend to bring the lead to an accurately controllable temperature. Thus, with the pins 49 and 49a in their retracted position, the molten material will conform to the shape of the mold cavities and will form a connecting bar and terminal post structure. While the lead is maintained in the molten condition at the substantially uniform temperature, an assembled battery cell group, with the lugs of the positive and negative plates extending downwardly, will be positioned over the mold structures, with the lugs on the plates of one polarity overlying the recess 33 in the mold structure 27 and the lugs on the plates of opposite polarity overlying the recess 33a in the mold structure 28. The plates are then moved downwardly until the lugs enter within the molten lead in the recesses 33 and 33a. The heat of the molten lead thereupon melts the surfaces of the lugs and thereby forms an intimate bond between said molten lead and said lugs. Immediately thereafter, and before there occurs such melting of the lugs as to materially injure the structure of the lugs, the heating of the material is terminated and the molten lead is rapidly cooled by spraying coolant, such as cold water, on the mold structures from the nozzles 82 and 82a. Thus, complete melting of the lugs of the battery plates is avoided so that the assembly, when rigidified, consists of plates having lugs thereon, which lugs are surrounded by, and united to, the connecting bar structure formed in the recesses 33 and 33a. Since the material in the recesses 33 and 33a is at a substantially uniform temperature throughout, and is cooled uniformly, the bonding of the connecting bar to the lugs will be uniform throughout the entirety of the battery cell group.

The plane of discontinuity between the plates 31 and 40 permits a heat differential to exist between them. Thus, with the heat source applied, at least primarily, to the base plate 31, this portion will be kept hot enough to effect the rapid melting of the surfaces of the lugs, above mentioned, while the material in the base plate 40 is permitted to attain a slightly lower temperature. Thus, where the lead is molten when introduced into the recesses, as is usual, it will at once assume the shape of the mold cavity in the base plate 40 and start to cool slightly while the material in the recesses 33 and 33a is held hot to react with the battery plate lugs. This insures that the post portions will be solid when ejection thereof occurs, even though the remainder of the casting has only set but is not entirely hard.

When the molten material has rigidified and cooled to the desired temperature, the flow of the cooling fluid may be discontinued by shutting off the valve 86. Thereafter, the ejecting frame 51 may be actuated by raising the handle 66. This causes the pins 49 and 49a to move upwardly within the central openings 47 and 47a of the terminal post molding cylinders 46 and 46a. It will be noted that as the arms 56 and 57 are raised, the connecting bar 52 will slide within the slot 58 in the arms toward the shaft 54. Thus, even though the handle is pivoted about the shaft 54, the pins 49 and 49a will move substantially vertically and there will be no binding of said pins within the central openings 47 and 47a. Movement of the pins 49 and 49a will eject the two terminal post and connecting bar structures from the mold cavities, which structures will be integral with the lugs of the plates of the respective polarities. The handle may then be returned to its initial position for a subsequent molding and assembling operation.

It will be apparent that electrical heating means could be provided for equalizing the temperature of the molten material within the mold cavities. However, such electrical heating means are usually somewhat slower in operation than the gas heating means disclosed herein.

It will also be apparent that the molding and fusing operation can be carried out in such a fashion that only one mold structure is provided and only the plates of one polarity are fused to the terminal post and connecting bar structure at one time. Thus, it is possible to either use only one of the mold structures 27 and 28 or to provide a machine which includes only one of such mold structures, in order that only plates of one polarity would be fused to the connecting bar and terminal post structure therefor.

Under certain conditions, it is advantageous to subject the molten lead, and/or the lugs, to vibration after insertion of the lugs into the molten lead and before any material cooling of the lead takes place. Such operation materially improves the distribution of the molten lead about the lugs and improves the quality of the bond between such lead and the lugs.

*Modifications*

There is shown in Figure 9 a schematic diagram of a continuous process for carrying out the teachings of this invention. Such a process uses a series of molds similar in construction to those disclosed with respect to the embodiment of the invention previously described. However, such mold structures need not have the specific heating nor the cooling means disclosed herein. Such mold members are processed by first passing through a heating zone 101 wherein such mold members are heated to an elevated temperature, as to about 600° F. The mold members are successively moved through a lead pouring station 102 wherein lead, which has been preheated to a suitable temperature, as, for example, about 620° F., is cast in the mold cavities in the mold members structures. The mold members are then moved through a second heating zone 103, wherein the temperature of the molds and the lead is stabilized at the desired molding temperature which, for example, may be 600° F. The mold members exiting from the heating zone 103 are then moved to a plate-inserting zone 104 wherein the lugs of the plates of the respective polarities, as previously discussed, are placed within that portion of the mold cavity which contains the material for forming the connecting bar structure. The mold members may then, if desired, be moved to a vibrating station 105 wherein either or both the lead and the plates may be vibrated to improve the distribution of the lead around the lugs. The mold members are then moved to a cooling zone 106 wherein the molten material is rapidly cooled, as by water sprays or other cooling means, to a reduced temperature, as 375° F. At this temperature, the lead is rigid and the plates and the connecting bar and terminal post structures may be handled as a unit. Upon exiting from the cooling zone 106, the mold members may then be moved to an ejecting station wherein the assemblies of the plates and the terminal post and connecting bar structures may be removed. The mold may then re-enter the heating zone 101 and progress through the molding and fusing cycle, as above described.

Although particular, preferred embodiments of the invention have been disclosed herein for illustrative purposes, it will be understood that variations or modifications thereof, which do not depart from the scope of such disclosure, are fully contemplated unless specifically stated to the contrary in the appended claims.

I claim:

1. A process for molding terminal post and connecting bar structures and securing said structures to the lugs of battery plates, including the steps: placing the molten molding material into two molds, each of said molds defining a downwardly extending cavity for forming a terminal post and a horizontally extending cavity for forming a connecting bar adjacent the upper end of said terminal post cavity; applying heat to the molding material in the connecting bar portions of said molds to continuously maintain the material therein in a molten condition at a substantially uniform temperature throughout the connecting bar portions of said cavities; isolating the terminal post portion of said cavities by having the terminal post portion of said cavities formed of a member of lower heat conductivity than the member which forms the connecting bar portion and providing a discontinuity therebetween so that the molding material therein is more easily rigidified than the material in the connecting bar portion; holding two assembled battery plate groups of opposite polarity with their lugs extending downwardly and placing the lugs of said groups within the respective connecting bar cavities and into the molten material therewithin to extract heat therefrom and thereby initiate cooling of the molding material; and immediately thereafter rapidly cooling said material by applying a cooling fluid to the mold to rigidify the molding material; and removing said battery groups with a terminal post and connecting bar structure united to each of said groups.

2. A mold for forming a battery terminal post and a connecting bar, comprising in combination: a first plate of highly heat-conductive material; a second plate positioned above said first plate and having a recess formed in one edge thereof, said recess defining a mold cavity for said connecting bar and said first plate defining the bottom of said connecting bar mold cavity; a cylinder extending downwardly and defining a mold cavity for said terminal post; a third plate separate from said first plate and disposed above said cylinder and defining a passage for molding material extending between said connecting bar mold cavity and said post mold cavity; an elongated burner positioned below said first plate and extending for substantially the entire length of said first plate whereby the entire length of said first plate may be substantially uniformly heated; and upwardly directed nozzle means below said first plate and adapted to be connected to a supply of water whereby water may be sprayed on said first plate to rapidly cool the molding material thereon.

References Cited in the file of this patent
UNITED STATES PATENTS

| | | |
|---|---|---|
| 1,719,829 | Bunker | July 9, 1929 |
| 1,797,684 | Handler | Mar. 24, 1931 |
| 2,454,051 | Galloway | Nov. 16, 1948 |
| 2,612,082 | Angell et al. | Sept. 30, 1952 |
| 2,660,414 | Von Ludwig | Nov. 24, 1953 |
| 2,799,905 | Vieth | July 23, 1957 |

OTHER REFERENCES

Metal Treatment and Drop Forging, September 1953, pages 391–398. Some applications of high-power ultrasonics in the Metal Industries.